(12) United States Patent
Davis et al.

(10) Patent No.: US 8,661,907 B2
(45) Date of Patent: Mar. 4, 2014

(54) REMOTE SENSING

(75) Inventors: Richard John Davis, Ledbury (GB); David John Hill, Weymouth (GB)

(73) Assignee: Optasense Holdings Ltd. (GB)

( * ) Notice: Subject to any disclaimer, the term of this patent is extended or adjusted under 35 U.S.C. 154(b) by 297 days.

(21) Appl. No.: 13/262,897

(22) PCT Filed: Mar. 30, 2010

(86) PCT No.: PCT/GB2010/000602
§ 371 (c)(1),
(2), (4) Date: Oct. 4, 2011

(87) PCT Pub. No.: WO2010/116119
PCT Pub. Date: Oct. 14, 2010

(65) Prior Publication Data
US 2012/0017687 A1   Jan. 26, 2012

(30) Foreign Application Priority Data
Apr. 7, 2009 (GB) .................................. 0905986.6

(51) Int. Cl.
*G01D 5/32* (2006.01)

(52) U.S. Cl.
USPC .............................................. 73/655; 73/643

(58) Field of Classification Search
USPC ................... 73/643, 655; 398/13; 340/853.1; 356/73.1; 385/12, 13
See application file for complete search history.

(56) References Cited

U.S. PATENT DOCUMENTS

| | | | | |
|---|---|---|---|---|
| 4,408,495 A | * | 10/1983 | Couch et al. ..................... | 73/655 |
| 5,991,479 A | | 11/1999 | Kleinerman | |
| 6,269,198 B1 | * | 7/2001 | Hodgson et al. ................. | 385/13 |
| 6,271,766 B1 | * | 8/2001 | Didden et al. ............. | 340/853.1 |
| 6,305,227 B1 | | 10/2001 | Wu et al. | |
| 7,848,645 B2 | * | 12/2010 | Healey et al. ................... | 398/16 |
| 8,131,121 B2 | * | 3/2012 | Huffman ......................... | 385/12 |
| 8,144,333 B2 | * | 3/2012 | Huffman ....................... | 356/480 |
| 2007/0135735 A1 | | 6/2007 | Ellis et al. | |

FOREIGN PATENT DOCUMENTS

| | | |
|---|---|---|
| EP | 0 531 017 | 3/1993 |
| EP | 1 912 049 | 4/2008 |
| GB | 2384313 | 7/2003 |
| GB | 2442745 | 4/2008 |
| JP | 09 270090 | 10/1997 |
| WO | WO03/062750 | 7/2003 |
| WO | WO 2006/092606 | 9/2006 |

* cited by examiner

*Primary Examiner* — J M Saint Surin
(74) *Attorney, Agent, or Firm* — McDonnell Boehnen Hulbert & Berghoff LLP

(57) ABSTRACT

A plurality of sensors output information into a distributed acoustic sensing (DAS) system via acousto-mechanical signals. The sensors are coupled to the optic fibre at the centre of the DAS system indirectly, the acousto-mechanical signal being transmitted via an intermediary body, such as the ground or a conduit.

14 Claims, 1 Drawing Sheet

REMOTE SENSING

FIELD OF THE INVENTION

The present invention relates to remote sensing, and in particular to relaying sensed data via acoustic/vibrational means. In certain aspects of the invention, sensed data can be relayed along a fibre optic cable and received by distributed acoustic sensing.

BACKGROUND OF THE INVENTION

Fibre optic sensors are becoming a well-established technology for a range of applications, for example geophysical applications. Fibre optic sensors can take a variety of forms, and a commonly adopted form is to arrange a coil of fibre around a mandrel. Point sensors such as geophones or hydrophones can be made in this way, to detect acoustic and seismic data at a point, and large arrays of such point sensors can be multiplexed together using fibre optic connecting cables, to form an all fibre optic system. Passive multiplexing can be achieved entirely optically, and a key advantage is that no electrical connections are required, which has great advantage in 'wet' applications such as sea bed monitoring.

In certain applications it is desirable to be able to determine the orientation of a particular point sensor, or group of such sensors packaged together (commonly referred to as a 4C package). WO 03/062750 describes an arrangement whereby an electromechanical orientation sensor is included in such a package, and converts its output into a form which can be detected by one or more of the sensors in that package. The package can be self contained, and only optical inputs and outputs to the package are required.

Distributed acoustic sensing (DAS) offers an alternative form of fibre optic sensing to point sensors, whereby a single length of longitudinal fibre is optically interrogated to provide substantially continuous sensing of acoustic/vibrational activity along its length. The single length of fibre is typically single mode fibre, and is preferably free of any mirrors, reflectors, gratings, or change of optical properties along its length. In order to interpret the received signal, the length of the fibre is divided into a plurality of channels for processing purposes.

In distributed acoustic sensing, Rayleigh backscattering is normally used. Due to random inhomogeneities in standard optic fibres, a small amount of light from a pulse injected into a fibre is reflected back from every location along the length of the fibre, resulting in a continuous return signal in response to a single input pulse. If a disturbance occurs along the fibre it changes the backscattered light at that point. This change can be detected at a receiver and from it the source disturbance signal can be estimated. Low noise levels and high discrimination can be obtained using a coherent optical time domain reflectometer (C-OTDR) approach as described above. An alternative approach to DAS is based on heterodyne interferometry. In this approach light which has passed through a given section of fibre is interfered with light that has not. Any disturbance to this section of fibre causes a phase change between the two portions of light that interfere and this phase change can be measured.

Applicant's currently preferred distributed acoustic sensing arrangement operates with a longitudinal fibre up to 40 km in length, and is able to resolve sensed data into 10 m lengths. Each 10 m length can be interrogated to provide real time data simultaneously along the length of the fibre.

Since the fibre has no discontinuities, the length and arrangement of fibre sections corresponding to each channel is determined by the interrogation of the fibre. These can be selected according to the physical arrangement of the fibre and the well it is monitoring, and also according to the type of monitoring required. In this way, the distance along the fibre, or depth in the case of a substantially vertical well, and the length of each fibre section, or channel resolution, can easily be varied with adjustments to the interrogator changing the input pulse width and input pulse duty cycle, without any changes to the fibre Distributed sensing is therefore able to provide long range, high resolution, high sensitivity monitoring of linear assets, be they pipelines, perimeters, transportation routes or telecommunication networks. A key advantage of this technique is that use can be made of a an unmodified, substantially continuous length of standard fibre, requiring little or no adaptation or preparation for use. pre-existing optic fibres, already in situ can often be used, and readings can be taken at any and all locations along its length, within the operating boundaries of the system in question.

It is desirable however to be able to remotely monitor additional environmental parameters along a linear asset.

JP09270090 describes the detection of information by a number of physical quantity sensors, and the impressing or vibration of an optic fibre in order to represent this information.

SUMARY OF THE INVENTION

There is described herein a sensor device comprising a sensor element adapted to sense an external stimulus and provide an output representative of the external stimulus; a processor arranged to receive said sensor output and to produce a drive signal in response thereto; and an actuator adapted to produce mechanical vibration in response to the received drive signal. The device may include a coupling arrangement for coupling the actuator to an elongate fibre optic cable.

Such a device affords the advantage of providing additional sensing capability along a fibre or linear asset which is being monitored using DAS. Preferably said coupling arrangement allows selective deployment along the length of a fibre optic cable. It is further desirable for the coupling arrangement to be releasable so as to allow redeployment of the sensor device along a fibre optic cable. This provides a device or set of devices which are modular and provides a flexible and versatile sensing capability, each device capable of being deployed at substantially any desired position along the fibre.

Devices as described above have been incorporated in a sensor system according to a first aspect of the invention, said sensor system comprising an elongate optic fibre; an interrogation unit adapted to provide distributed acoustic sensing along a length of said optic fibre; and one or more sensor devices coupled to said optic fibre, each said device including a sensor element adapted to sense an external stimulus and an actuator to produce an acoustic output signal representative of said sensed data, said acoustic output being capable of detection by said interrogation unit; wherein said acoustic coupling is by indirect connection of the sensor element to the optic fibre Indirect connection of the sensor devices and the optic fibre offers the advantage that the fibre path does not need to constrained by sensor device location, or vice versa. In this way coupling can be via an intermediate body, which may be the ground, a pipe or casing, a structural element or support, for example. It may be convenient for a fibre to be arranged along one path in or on the ground, or along a pipe for example, yet for positioning of the sensor device or devices to be more convenient at or on another part of the ground or pipe. This may be especially true if an optic fibre to be used is a pre-existing fibre. Similarly a fibre may be routed along a beam or structure, while sensor devices could be located on another part of the beam or structure, but coupled to the fibre through said structure. In other words the intermediate body need not be a dedicated part of the sensor system, and structures or bodies which are pre-existing in the sensed environment can be used.

Thus, according to this aspect of the invention optic fibres can be employed even if direct access to the fibre is difficult or impossible. Also, fibre paths and device location can, to a certain extent, be determined independently, potentially providing superior locations or routing for both.

Different media will have different coupling characteristics, and this can be taken into account by appropriate selection of, eg, frequency and/or amplitude of the acousto-mechanical output. Appropriate data transmission schemes and filtering at the interrogator can provide resilience to noise arising as a result any intermediary between sensor device and optic fibre.

Preferably the sensor device or devices are physically separated by greater than or equal to 100 mm, 200 mm or even 500 mm. Separation is also preferably less than or equal to 5 m, 2 m or 1 m in some embodiments. Where the sensor element and the actuator of a device are not substantially collocated, it is the separation of the actuator and the optic fibre which is relevant here.

While DAS provides information on acoustic or vibrational stimuli, the sensor element can be responsive to different stimuli and record data for environmental stimuli such as ambient light, temperature, air speed and/or direction, humidity or moisture. Additionally or alternatively, sensor elements may be provided which are adapted to monitor parameters of an external device, for example fuel level, battery level, or temperature.

In addition to monitoring continuous variables, sensor elements can be digital and arranged to monitor switch states such as a door switch. Each device may include more than one sensor elements adapted for monitoring different stumuli. Other types of digital data may also be handled, for example imagery from a camera could be processed to produce a drive signal. In such a case, it is likely that only still frames would be appropriate, and that each frame would have to be broken into a number of portions for sequential processing leading to a very low frame rate. Nevertheless, an image or images could still be recovered by a DAS system in this way if desired.

Devices are can preferably operate remotely for extended periods of time, and in embodiments each device includes a dedicated power source such as a battery. The device may additionally include means for harvesting environmental energy such as a solar generator or wind turbine.

Embodiments of the device may also include a number of digital outputs for controlling external equipment in response to sensed stimuli, for example to indicate fault conditions and/or effect shut down or power saving.

Sensor systems in certain embodiments include more than one sensor device, and said devices are adapted to sense different external stimuli or combinations of external stimuli.

A second aspect of the invention provides a method of sensing comprising operating an interrogation unit to provide distributed acoustic sensing along an elongate optic fibre; coupling at least one sensor device to said optic fibre at a desired location along the length of the fibre; measuring an external parameter at said desired location with said sensor device; coding said measurement value into an acousto-mechanical signal; transmitting said signal acoustically through an intermediary body to said optic fibre, and detecting said acousto-mechanical signal at said interrogation unit, and decoding to derive said measurement value.

The invention extends to methods, apparatus and/or use substantially as herein described with reference to the accompanying drawings.

Any feature in one aspect of the invention may be applied to other aspects of the invention, in any appropriate combination. In particular, method aspects may be applied to apparatus aspects, and vice versa.

Furthermore, features implemented in hardware may generally be implemented in software, and vice versa. Any reference to software and hardware features herein should be construed accordingly.

DESCRIPTION OF THE DRAWINGS

Preferred features of the present invention will now be described, purely by way of example, with reference to the accompanying drawings, in which.

DESCRIPTION OF THE INVENTION

Figure 1:
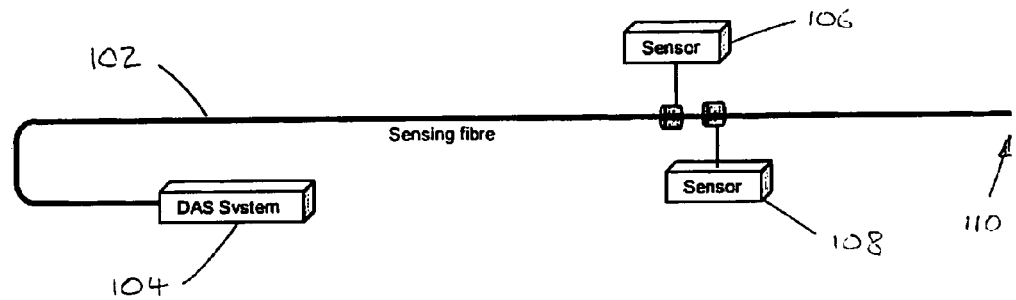
FIG. 1 shows an overview of a system according to one aspect of the present invention

Referring to FIG. 1, an elongate length of standard single mode optic fibre 102 is connected to a distributed acoustic sensing (DAS) interrogation unit 104. The optic fibre may be located along any path which it is desired to monitor, common locations including along perimeters such as borders and fencelines (burried or on the surface) or along linear assets such as pipelines, cable runs, roads or train tracks for example. The path need not be straight.

Interrogation unit 104 is adapted to launch light into the fibre and detect light returned from the fibre in such a way as to provide distributed sensing along the length of the fibre. In the present example, the unit is substantially as described in GB 2442745, and uses Optical Time Domain Reflectometry (OTDR) to provide simultaneous independent sensing capability of approximately 4000 adjacent sensing 'bins' 10 m in length. The distributed acoustic sensing is such that no reflectors or conditioning is required along the fibre path, and free end 110 of the fibre can simply be left as a cleaved cut.

Two sensor devices 106 and 108 are shown located at different portions of the fibre 102. Each sensor device includes a sensing element for detecting a particular external/environmental stimulus, such as ambient light or temperature, and a vibrator for producing an acoustic signal. Each sensor device collects data for the relevant parameter at its position, and outputs the collected data as an acousto-mechanical signal produced by the vibrator or acousto-mechanical transducer. These acoustic signals are detected at interrogation unit 104 and the data can be recovered.

The configuration of the system is extremely flexible and modular in design. The sensor devices can be located at any point along the length of fibre 102, and any number of sensor devices is possible up to a practical limit. Sensor devices adapted to sense different parameters can be used simultaneously, and in any sequence or combination along the length of the fibre. Furthermore, with a suitable location mechanism, devices can be positioned and repositioned as desired, and switched between fibres. This makes such an arrangement suitable for permanent monitoring of external parameters as well as temporary monitoring, along the length of a fibre which is being operated as a distributed sensor.

Figure 2:
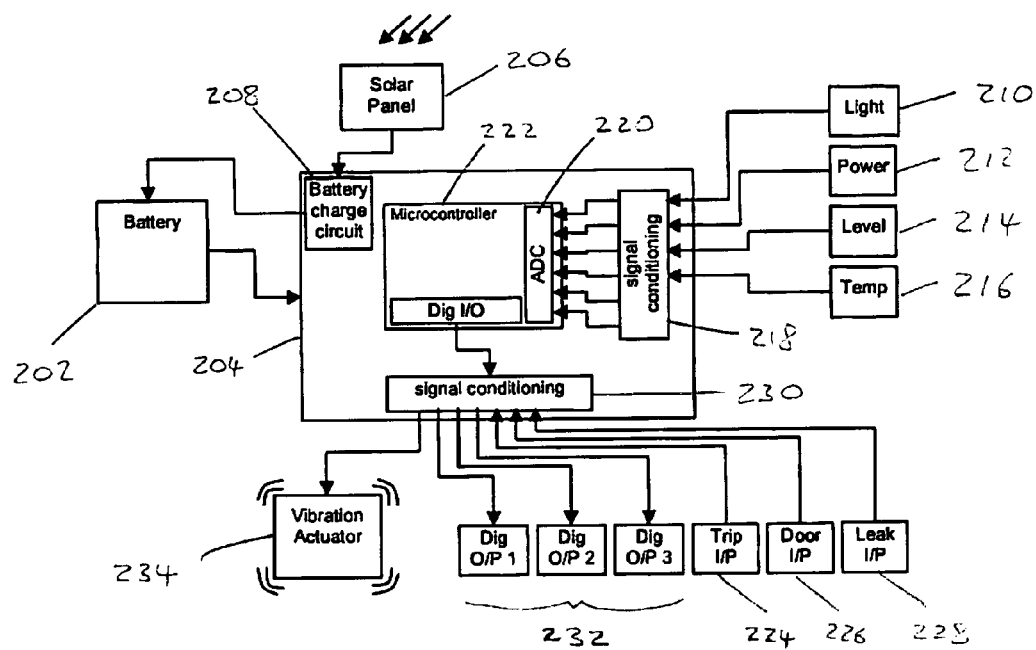
FIG. 2 shows the top level design of an embodiment of aspects of the invention

Turning to FIG. 2, a battery 202 provides power to a central control unit 204. Environmental energy harvesting may be achieved by, for example solar panel 206 which allows battery 202 to be charged via charging circuit 208.

Central control unit 204 receives inputs from sensing elements 210, 212, 214, 216, which each provide an analog output representative of a continuous variable being measured. In this example light level, power, liquid level and temperature are monitored. The outputs from the sensing elements 210 to 216 are received by signal conditioning unit 218 where they are buffered and amplified appropriately. The conditioned signals then pass to an ADC 220, which is provided as part of a low power microcontroller 222, and converted to digital form.

Further inputs can be received in the form of digital signals from sensing elements 224, 226 and 228, which are binary sensors detecting a trip switch, a door closure sensor and a leak sensor. These enter control unit 204 via a digital signal conditioner 230. The device may also include a number of digital outputs 232 which can be used to control local equipment in response to sensed input conditions, eg to shut down power hungry systems when a generator is running low on fuel, or to activate cooling on reaching a threshold temperature.

Acousto-mechanical transducer 234 typically comprises a commercially available piezoelectric actuator or vibrator or in certain applications a micro DC motor or piezoelectric motor may be employed. Preferably these should be capable of producing vibrations in the region of 100 Hz to 1 kHz. The sensor device may be housed in a single casing including the acousto-mechanical transducer, and acoustically coupled to the optic fibre. Alternatively the vibration actuator could be connected to the rest of the sensor device via a flying lead, in which case only the vibration actuator need be coupled to the fibre, and the remainder of the device could be located a short distance away.

In one example, if the fibre is mounted along the outside of a conduit such as a concrete pipe or a metallic well bore casing, then the sensing device could be mounted to the pipe, but remotely from and not directly connected to the fibre. Possibilties include spacing one or more devices circumferentially away from the fibre, or on the interior of the conduit. Alternatively if the fibre is buried in the ground, sensing devices can be located on the ground surface—a ground fixing spike could be used to provide appropriate coupling of the acousto-mechanical signal into the ground, and thereby to the fibre. A third example might have a fibre arranged along the rail of a railway track, with one or more sensor devices located on the sleepers, acoustic coupling being along a path including the sleeper and a portion of the rail. In such an example the ground may provide additional acoustic coupling effects, which may or may not be desirable.

In all examples, the fibre can additionally be used to sense disturbances other than those produced by the sensor devices.

Microcontroller 222 encodes sensed data into a form suitable for transmission onto the optic fibre and sends a corresponding drive signal to acousto-mechanical transducer 234. The encoding process may take a variety of forms, and data can be transmitted by varying the vibration amplitude of frequency, or encoding the data digitally in a series of pulsed vibrations, and the skilled person will be able to select an appropriate scheme. Nevertheless an example of a digital coding scheme will be described below.

A basic transmission scheme involves inducing two known frequencies; one representing a digital '1'; the other, a digital '0' on to the optical sensor which is then received by the DAS/signal processing unit which has been programmed to expect these frequencies and interpret them accordingly. For example, a '1' could be represented by a signal of 500 Hz and a '0' by a 1 KHz signal. This would be generated by a single vibration actuator. Alternatively, multiple actuators, each operating at different pairs of frequencies to generate 1/0 signals, could be used to multiply the overall data rate. Because of the nature of DAS, which is advantageously able to sample different portions of the fibre simultaneously and independently, the same coding scheme and frequencies can be used by multiple separate sensing devices (assuming the resolution of the DAS is sufficient to separate the minimum spacing between devices).

In an example where the DAS system sampling rate is 2.5 KHz, the modulated signal from the remote unit should not exceed 1.25 KHz for reliable extraction of the data. Where a DAS system is used to monitor a relatively short length of fibre, then higher sampling rates are possible. For a 4 km length of fibre, sampling rates of 25 KHz are achievable, and hence the modulated signal can reach 12.5 KHz.

Data transmission in an asynchronous, autonomous stand-alone system with no hand-shaking can be achieved as follows.

Start and stop bits are required between data bytes. These would comprise a long burst of one of the two frequencies (a '1' or '0') which would recognised by the DAS processing system. The variable having the greatest dynamic range is likely to be ambient light. This can vary between 0.0001 lux for a moonless cloudy night to 130,000 lux for a bright sunny day. This requires more sensitivity and dynamic range than many light sensors can realise, but to represent this range accurately would require a large data packet size and more advanced ADCs than those found on low power microcontrollers. For this application, some sensitivity would need to be lost. To represent the ~0-130,000 range, a 17 bit ADC and word would be needed (low power microcontroller ADCs are generally 8 bits wide), thus, a compromise would need to be sought. This can be managed through the signal conditioning stage and provide a good range of ambient light.

The bytes for each analogue sensor would be 8 bits and for each digital input, 1 bit is required. The digital inputs could be sent as a single word, each analogue data set would be sent as a word per sensor.

The data packet would be set at a standard length to maintain a simple modular system, so for example; the number of analogue sensor inputs available would be fixed (8×8 bit); the number of digital sensor inputs available would be fixed (8×1 bit) and start/stop bits would be fixed (10 bits each).

So, using the above guidelines, a single data packet would be:

(8×8)+8+20=92 bits

Given a bit length of 0.1 s (actuator vibrating for 100 ms) and a total number of 92 bits per packet, total time required for packet transmission=92×0.1=9.2 s. If multiple vibration actuators can be used, this time can be reduced. For two actuators:

Actuator 1: Start/Stop (20 bits)+4 analogue (4×8)

Actuator 2: Start/Stop (20 bits)+4 analogue (4×8)+1 Digital (1×8)

The total time would be equal to that taken by actuator 2 which is (20+(4×8)+8)×0.1 s=6 s It will be understood that the present invention has been described above purely by way of example, and modification of detail can be made within the scope of the invention.

Each feature disclosed in the description, and (where appropriate) the claims and drawings may be provided independently or in any appropriate combination.

The invention claimed is:

1. A sensor system comprising:
an elongate optic fibre;
an interrogation unit for providing distributed acoustic sensing along a length of said optic fibre; and
one or more sensor devices coupled to said optic fibre, each said device including a sensor element for sensing an external stimulus and an actuator for producing an acousto-mechanical output signal representative of said sensed data, said acousto-mechanical output being detectable by said interrogation unit;
wherein said acoustic coupling is by indirect coupling of the sensor element to the optic fibre.

2. The sensor system according to claim 1, wherein said one or more sensor devices and said optic fibre are acoustically coupled via an intermediate body.

3. The sensor system according to claim 1, wherein said optic fibre is located underground in use, and wherein said one or more sensor devices is acoustically coupled to said optic fibre through the ground.

4. The sensor system according to claim 1, wherein said optic fibre is mounted to a conduit in use, and wherein said one or more sensor devices is acoustically coupled to said optic fibre through said conduit.

5. The sensor system according to claim 1, wherein said one or more sensor devices and said optic fibre are physically separated by greater than or equal to 200 mm.

6. The sensor system according to claim 1, wherein said interrogation unit detects radiation backscattered from one or more input pulses.

7. The sensor system according to claim 1 wherein said one or more sensor devices includes a dedicated power source.

8. The sensor system according to claim 1 wherein said one or more sensor devices includes a power converter for harvesting environmental energy.

9. The sensor system according to claim 1 wherein said one or more sensor devices is adapted to sense at least one of ambient light, temperature, air speed and/or direction, or moisture.

10. The sensor system according to claim 1 wherein said one or more sensor devices is configured to measure an operating parameter of an external apparatus.

11. The sensor system according to claim 1, wherein said system includes more than one sensor device, and said devices are configured to sense different external stimuli.

12. The sensor system according to claim 1 wherein said optic fibre is located underground in use, and wherein said one or more sensor devices is acoustically coupled to said optic fibre through the ground;
wherein said one or more sensor devices and said optic fibre are physically separated by greater than or equal to 200 mm; and
wherein said interrogation unit detects radiation backscattered from one or more input pulses.

13. The sensor system according to claim 1 wherein said optic fibre is mounted to a conduit in use, and wherein said one or more sensor devices is acoustically coupled to said optic fibre through said conduit;
wherein said one or more sensor devices and said optic fibre are physically separated by greater than or equal to 200 mm; and
wherein said interrogation unit detects radiation backscattered from one or more input pulses.

14. A method of sensing comprising:
operating an interrogation unit to provide distributed acoustic sensing along an elongate optic fibre;
coupling at least one sensor device to said optic fibre at a desired location along the length of the fibre;
measuring an external parameter at said desired location with said sensor device;
coding said measurement value into an acousto-mechanical signal;
transmitting said signal acoustically through an intermediary body to said optic fibre, and
detecting said acousto-mechanical signal at said interrogation unit, and decoding to derive said measurement value.

* * * * *